United States Patent [19]
Domash

[11] Patent Number: 5,937,115
[45] Date of Patent: Aug. 10, 1999

[54] SWITCHABLE OPTICAL COMPONENTS/ STRUCTURES AND METHODS FOR THE FABRICATION THEREOF

[75] Inventor: Lawrence H. Domash, Conway, Mass.

[73] Assignee: Foster-Miller, Inc., Waltham, Mass.

[21] Appl. No.: 08/797,950

[22] Filed: Feb. 12, 1997

[51] Int. Cl.[6] .............................. G02B 6/26; G02B 6/34
[52] U.S. Cl. .............................. 385/16; 385/20; 385/24; 385/31; 385/37; 385/10; 359/130
[58] Field of Search ........................... 385/8–10, 16–24, 385/31, 37, 40; 359/283, 251, 252, 224, 225, 291, 295, 573, 117, 130; 349/86, 92, 201, 202, 117, 141, 146

[56] References Cited

U.S. PATENT DOCUMENTS

| | | | |
|---|---|---|---|
| 4,003,629 | 1/1977 | Baues et al. | 385/37 |
| 4,006,963 | 2/1977 | Baues et al. | 385/37 |
| 4,688,900 | 8/1987 | Doanne et al. | 350/347 |
| 4,938,568 | 7/1990 | Margerum et al. | 350/334 |
| 5,096,282 | 3/1992 | Margerum et al. | 359/3 |
| 5,182,665 | 1/1993 | O'Callaghan et al. | 359/95 |
| 5,488,681 | 1/1996 | Deacon et al. | 385/37 |
| 5,544,268 | 8/1996 | Bischel et al. | 385/4 |

OTHER PUBLICATIONS

Sutherland, R. L., V. P. Tondiglia, L. V. Natarajan, T. J. Bunning and W. W. Adams, "Switchable holograms in a new photopolymer–liquid crystal composite." *SPIE: Diffractive and Holographic Optics Technology*, 2404:132–, Feb. 9–10 1995.

Sutherland, R. L., V. P. Tondiglia, L. V. Natarajan, T. J. Bunning and W. W. Adams, "Electrically switchable volume gratings in polymer–dispersed liquid crystals." *Appl. Phys. Lett.*, 64 (9):1074–1076, Feb. 28, 1994.

Sutherland, R. L., V. P. Tondiglia, L. V. Natarajan and T. J. Bunning, "Bragg Gratings in an Acrylate Polymer Consisting of Periodic Polymer–Dispersed Liquid–Crystal Planes." *Chemistry of Materials*, 5:10 1533–1538, 1993.

Sutherland, R. L., V. P. Tondiglia, L. V. Natarajan, T. J. Bunning and W. W. Adams, "Volume holographic image storage and electro–optical readout in a polymmer–dispersed liquid–crystal film." *Optical Letters*, 20:11 1325–1327, Jun. 1, 1995.

Sutherland, R. L., V. P. Tondiglia, L. V. Natarajan, T. J. Bunning and W. W. Adams, "Development of photopoly-merner–liquid crystal composite materials for dynamic hologram applications." *SPIE: Diffractive and Holographic Optics Technology*, 2152:303–313, 26–28 Jan. 1994.

*Primary Examiner*—Hemang Sanghavi
*Attorney, Agent, or Firm*—Wolf, Greenfield & Sacks, P.C.

[57] ABSTRACT

A variety of optical components or nodes are provided which components are formed utilizing holographically polymerized polymer/liquid crystal composites, and which components include free space/unguided wave switches, guided wave switches, out/in couplers, reflection nodes/ reflection filters and guided wave interconnect nodes. Selected ones of these nodes may be designed to operate either in a single wavelength mode or in a multiwavelength WDM mode. All of the components are switchable so as to able to modify the component output to which an optical signal received on a component input is applied as a function of an electric field applied across the component, and to vary the channel outputted on a given output for WDM operation. Nodes of the same type or node of two or more different types may be interconnected into two dimensional and/or three dimensional structures, particularly switching structures for a telecommunications or other purposes, including such structures adapted for multiwavelength operation. For preferred embodiments, guided wave optical paths, and in particular waveguides, are utilized for node interconnects, with various techniques being presented for forming nodes and/or structures as integrated optical structures.

30 Claims, 10 Drawing Sheets

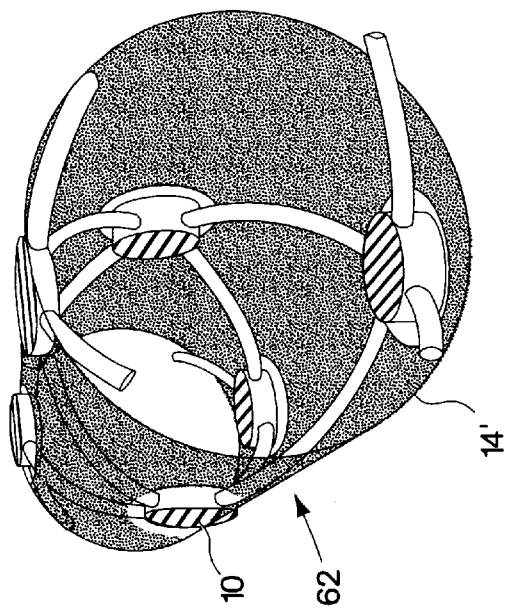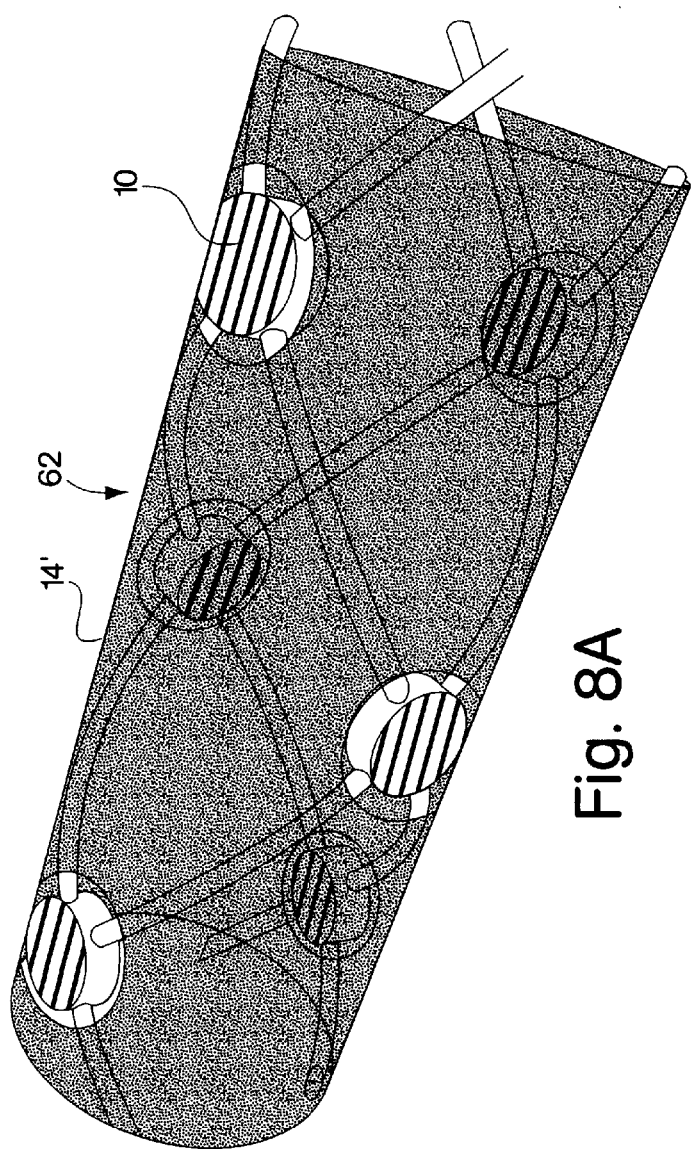

SWITCHABLE OPTICAL COMPONENTS/STRUCTURES AND METHODS FOR THE FABRICATION THEREOF

This invention was made with government support under contract Number F30602-91-C-0085 awarded by Rome Lab, Department of the Air Force. The government has certain rights in the invention.

FIELD OF THE INVENTION

This invention relates to switchable optical components, particularly ones utilizing guided wave optics, to fiber optic switches, and other optical structures utilizing such components and to methods for the fabrication of such components, particularly when implemented in optical waveguides.

BACKGROUND OF THE INVENTION

Because of their improved bandwidth properties, optical signals are being increasing utilized for the transmission of data. Further, the bandwidth capacity of a given fiber optic cable can be further increased by transporting a multiplicity of independent signals within a single fiber on separate channels at slightly different wavelengths, a technique known as wavelength division multiplexing (WDM). Thus, for example, a nominally 1550 nm fiber optics signal might comprise four or eight channels or even 64 or more channels, each separated by 0.8 nm (corresponding to 100 GHz) or 1.6 nm (corresponding to 200 GHz). However, for such signals to be useful, it must be possible to switch the optical signals coming in on an optical fiber (or other optical conduit) to a fiber/conduit leading to a desired destination. More generally, in complex fiber optic structures such as those used in the telecommunications industry and for sensor and computer data networks, light signals must be efficiently routed or switched from an array of N incoming optical fibers, which fibers may be single mode or multimode, to an array of M outgoing optical fibers. Such a switch will sometime be referred to hereinafter as an N×M switch or crossconnect.

While a number of techniques have been proposed over the years for performing N×M switching optically, none of these techniques have proved to meet all requirements simultaneously. This is partly due to the varied architectures which are required for such switches. For example, an N fiber in, N Fiber out (N×N) switch that maps each incoming fiber optical signal to one and only one fiber output is termed an N×N crossconnect. It is nonblocking if any connection is possible, without regard to earlier established connections. For some applications, reconfigurably nonblocking switches are sufficient. In other applications, switches that multicast or broadcast, sending one incoming signal to more than one output, or that perform other variant functions, are required. The data capacity demands on fiber optic networks are also becoming more complex, imposing a requirement that switching technologies be scalable so as to be extendable in a straight forth manner from small switches (for example 2×2 or 4×4 to larger switches such as 64×64, 1024×1024, and beyond). It is also desirable that such switches be integrable such that individual miniaturized switching elements can be combined with many others on a single chip or substrate to provide a larger N×N or N×M crossconnect structure. However, designing such structures, particularly for larger switches, is very complex even for single channel operation, and the complexity increases dramatically for multichannel WDM operation. Multichannel operation facilitates an increasingly important advantage of optically transparent transport and switching which is that several noninteracting signals may pass through the switch simultaneously which signals convey entirely incompatible data rates, encodings and protocols in parallel without compromising one another.

Another requirement for optical switches of the type described above in particular, and for optical components and structures in general, is that they efficiently interface with optical fibers. This is true because, while optical signals can travel through free space, to minimize signal losses and to optimize flexibility in transmission, most optical signals used in telecommunications are transmitted through optical fibers. Other key performance parameters include minimizing insertion loss, crosstalk and polarization sensitivity. Low operating power and high reliability are also important.

Because satisfactory products for performing such optical switching have not existed, it has therefor been necessary to convert optical signals to be switched into electrical signal for switching and to then reconvert the signals to optical signals for outputting. This technique can be expensive, time consuming, impose bandwidth limitations on the system and introduce several sources of potential error. It can also limit the flexibility of the system and is generally not an efficient way to operate.

In addition to the switching applications discussed above, there are numerous applications where a need exists to be able to change the direction in which an optical signal is passing through a waveguide, filter an optical signal, particularly a multiwavelength or multichannel signal so as to selectively pass or block various of the multiwavelengths or multichannels, and/or to selectively couple the multiwavelength or multichannel along optical paths out of the plane of the waveguide.. There are also applications where a need exists to perform more complex transformations on an optical signal. For example, it may be desired to alter the propagation from a guided mode characteristic of the input optical signal in the optical component or structure before outputting it to a radiated or free space mode (or other unguided mode) or it may be desirable to have an optical component which can selectively (i.e. switchable) focus an incoming beam in a desired direction, or perform other complex optical functions on the input. It should be possible to perform all of these functions utilizing optical components and/or structures which are relatively easy and inexpensive to fabricate.

DEFINITIONS

In the following sections, various terms will be used, which terms should be considered to have the following definitions:

"Bragg gratings or gratings" are periodic structures formed by spatially varying refractive index distributions or similar perturbations throughout a defined volume or the boundary of a guiding region. Simple Bragg gratings are periodic in one dimension. More complex diffractive structures, which for purposes of this invention will also be encompassed with this definition may be volume holograms, detractive lenses, or other computer generated or optically recorded diffractive index distributions designed and fabricated for purposes of coupling an incident laser or other light beam or a light beam received through guided wave optics into a desired output state or mode.

"Holographically polymerized polymer/liquid crystal composite or HPP/LCC" are the composite material systems resulting from the method of polymerizing mixtures of polymer, liquid crystal and other ingredients using interfering laser wavefronts in order to produce a captive distribution of microdroplets. While HPP/LCC's may take many forms, some HPP/LCC's suitable for use in practicing the teachings of this inventions are as described for example by Sutherland et al and Margerum et al in the following:

1. R. L. Sutherland, L. V. Natarajan, V. P. Tondiglia, T. J. Bunning, Bragg Gratings in an Acrylate Polymer Consisting of Periodic Polymer-Dispersed Liquid-Crystal Planes, Chem. of Materials, 1993, 5, 1533.38.
2. R. L. Sutherland, L. V. Natarajan, V. P. Tondiglia, T. J. Bunning and W. W. Adams, Development of Photopolymer/Liquid Crystal composite Materials for Dynamic Hologram Applications, Proc. SPIE Vol. 2152, paper 38.
3. V. P. Tondiglia, L. V. Natarajan, R. L. Sutherland, T. J. Bunning and W. W. Adams, Volumn holographic image storage and electro-optic readout in a polymer dispersed liquid crystal film, Opt. Lett. v. 20, p. 1325, 1995.
4. R. L. Sutherland, L. V. Natarajan, V. P. Tondiglia, T. J. Bunning and W. W. Adams, Switchable holograms in a new photopolymer-liquid crystal composite, Proc. SPIE, Vol. 2404, p. 132, 1995.
5. R. L. Sutherland, L. V. Natarajan, V. P. Tondiglia, T. J. Bunning and W. W. Adams, Electrically switchable volumn gratings in PDLC, Appl. Phys. Lett., Vol. 64, p. 1074, 1994.
6. U.S. Pat. No. 4,938,568. Jul. 3, 1990. John D. Margerum, et al.
7. U.S. Pat. No. 5,096,282. Mar. 17, 1992. John D. Margerum, et al.

"Electronically switchable Bragg grating or (ESBG)" any of an extensive range of devices and device geometries realized utilizing the aforementioned holographically polymerized polymer/liquid crystal composite.

SUMMARY OF THE INVENTION

In accordance with the above, this invention provides a switchable optical component formed of an ESBG element, electrodes for selectively applying an electric field across the element, at least on optical input path to the element and at least one optical output path from the element, with at least one of the input optical paths and output optical paths being guided wave optical paths. The optical effect which the element has on optical signals inputted thereto, and thus on any optical signal appearing on the at least one output from the element, varying as a function of the electric field applied across the element. The guided wave optical path may be formed of optical fibers or of optical waveguides and the component may be an integral device with a substrate and with the optical waveguide and the element being formed on the substrate. The element may be formed in a core region of the optical waveguide or may be formed in a cladding region of the optical waveguide. Where at least the input optical paths are waveguides, the aspect ratio for at least the input path waveguides may be controlled to compensate for polarization sensitivity of the element.

Where the component is an optical switch, the element may have two input paths and two output paths, the element passing light received on either input path to either output path depending on the electric field across the element. For preferred embodiments, each output path is at a Bragg angle to a different one of the input paths and, in the absence of an electric field across the element, light received on an input path is outputted to the output path at a Bragg angle thereto, while in the presence of an electric field across the element, light passes substantially undeflected through the element to an output path which is not at a Bragg angle to the input and which is normally at 180 degrees to the input path.

The optical signals applied to the element may be WDM signals having multiple channels at different wavelengths, with the channel from an input path which is passed to a given output path varying as a function of the electric field applied across the element.

The component may also be a reflection component, an optical signal on an input path being reflected to the input path for a first electric field across the element, which is a zero electric field for a preferred embodiment, and passing through the element to an output for a second electric field across the element. Where the optical signals apply to the reflection component are WDM signals, the component can function as a reflection filter, the one of more channels being reflected and one or more channels of an input passing through the element to an output being a function of the electric field across the element.

The component may also be an out-coupler (or an in-coupler) with a signal on an input path being coupled out of the plane of a component at a selected angle or passing through the element as a function of the electric field across the element. Where the optical signal applies to an out-coupler is a WDM signal, the channels coupled out of the plane of the component, and the angle at which each channels is coupled out, are a function of the electric field across the element.

The input path and output path may also be guided wave optical components having a core region and a cladding region, with the guided wave optical components being oriented so that the cladding regions thereof significantly overlap in a selected area. The element is positioned in this overlap area, thus being in the cladding region for both paths. For some embodiments, the element may have a complex, computer generated grating formed therein.

The components may function as nodes in various switchable optical structures. In particular, such structure may include two ESBG nodes, each of which has at least one optical input and at least one optical output, N optical inputs into the structure, with each optical input being optically connected to a node input, optical interconnects within the structure joining selected node outputs to selected node inputs, M optical outputs from the structure, each optical output being optically connected to a node output and controls for selectively applying electric fields across the node ESBG's to control the optical outputs to which optical signals appearing at the optical inputs are applied. The structure may be a planar structure, with the optical interconnects being guided wave optical paths, and is preferably an integrated structure utilizing waveguides as the optical interconnects. In addition to the two dimensional structures described above, three dimensional structures may also be formed of a plurality of substructures of nodes connected in the substructures by guided wave paths. Each substructure may include nodes for selectively interconnecting the substructures through optical paths, which optical paths may be guided wave paths or unguided wave paths through a transparent medium. The nodes interconnecting substructures in the latter case may be guided wave/unguided wave optical couplers. Where substructures interconnects are guided wave paths, fiber optic paths may be used for this function. The structure may also be an integrated structure formed on a curved substrate such as, for example, a cylinder.

Where the optical signals applied to the structure are WDM signals having multiple channels at different wavelengths, the ESBG's for at least selected one of the nodes are wavelength selective ESBG's, with the one or more channels/wavelengths outputted from each such node being a function of the electric field applied thereacross. The WDM structures may be two dimensional or three dimensional structure with the nodes in each substructure for interconnecting substructures in a three dimensional WDM structure being wavelength selective nodes.

The nodes used in the various structures may be free space switch node (i.e. unguided wave nodes), guided wave switch nodes, guided wave/unguided wave in/out coupler nodes, reflection nodes and guided wave interconnect nodes, with all of the nodes in a given structure being of the same type, for example guided wave switch nodes, or with two or more different types of nodes being utilized in a single structure, thereby providing significant design flexibility in architecture for the structures.

Individual ESBG modes and structures utilizing such nodes may be fabricated as part of an integrated optics device formed by (a) providing a substrate, (b) forming waveguides on the substrate, (c) forming an HPP/LCC in a region of the waveguide, and (d) providing electrodes positioned to, when energized, provide a selected electric field across the HPP/LCC. The region in which the HPP/LCC is formed may be in the core of the waveguide, in which case step (c) above may include the steps of forming an enlarged region in the core of at least selected ones of the waveguides, filling the enlarged region with a polymer/liquid crystal composite, and exposing the composite to a selected interfering radiation pattern to form a selected grating therein. Step (d) may include the step of providing an electrode under the HPP/LCC and covering the enlarged region with an element containing a transparent electrode. Alternatively, step (d) may include the steps of positioning a first transparent electrode on a side of the HPP/LCC to be passed through by an optical signal entering the HPP/LCC and positioning a second electrode on the side of the HPP/LCC opposite that for the first electrode. Alternatively, the HPP/LCC may be positioned in the cladding region of the waveguide in which case, step (c) may include substantially removing the cladding in such region, applying a polymer/liquid crystal composite as a film over the core in such region and exposing the composite to a selected interfering radiation pattern to form a selected grating therein. Alternatively, with the HPP/LCC in the cladding, step (c) may be performed by substantially removing the cladding in the region and both floating and attaching a HPP/LCC decal to the waveguide core in such region.

The foregoing and other object, feature and advantages of the invention will be apparent from the following more particular description of preferred embodiment of the invention as illustrated in the accompanying drawings.

IN THE DRAWINGS

FIGS. 8A and 8B are a side perspective view and an end perspective view respectively of a 4×4 Benes net of six ESBG nodes formed on a transparent cylinder.

DETAILED DESCRIPTION

Figure 1:
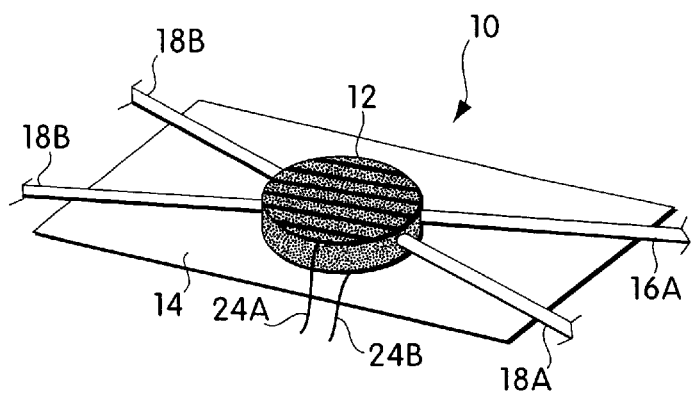
FIG. 1 is a diagrammatic perspective view of a guided wave switch node suitable for use in practicing the teachings of this invention.

In general, this invention provides a variety of switchable optical components or nodes utilizing ESBG's, some of which components are designed as integrated optics components, which components are adapted to operate in a variety of propagation formats, including free space or unguided format, guided wave format (including fiber optic cable and waveguides) and multiwavelength or WDM format. These components may be selectively interconnected in a wide variety of ways to form nodes in crossconnect switching and other optical structures, including large and complex optical structures having multiple inputs and outputs.

To fully understand the invention, it should be appreciated that it is known in the art of photonics, integrated optics and fiber optics that Bragg grating structures can perform a wide range of useful functions. For example, a fiber Bragg grating (i.e. a Bragg grating formed in an optical fiber) can act as a wavelength filter to couple a forward propagating mode at a specific band of wavelengths into a backward propagating mode (reflective filter). A waveguide coupling grating can couple a guided mode to a radiated (i.e. free space or unguided) mode, or vice versa (input/output coupler). Two nearby or parallel dissimilar waveguides can be coupled one to another by means of a Bragg grating region (interguide coupler). Two guided or partially guided modes intersecting within a planar structure at a relative angle can be coupled one to another (coplanar coupler). Many of these functions are known from early years of fiber optics and integrated optics.

Switching in a broad sense may be considered the activation or deactivation of a mechanism for coupling of one free space or other unguided mode (a mode passing without a guided optics member through a transparent medium such as air, glass or transparent plastic) or guided mode (a mode being characterized by spatial localization, propagation direction, free space wavelength, polarization state, modal field distribution and modal propagation vector) into another mode. From the standpoint of the fundamental physics of coupling one mode into another, Bragg gratings are highly efficient. This is because an incoming mode with propagation vector K1 can be coupled to an outgoing mode with vector K2 by means of a Bragg grating with grating vector A if the vector sum K1+A=K2 is satisfied. This is the well known Bragg condition and determines the required grating period Λ. Since a Bragg grating effectively only contains a very narrow band of spatial frequencies, namely the grating period, it accomplishes the coupling with a minimal rearrangement of matter. If a switch is desired, a mechanism to activate or deactivate a Bragg grating will be far more efficient and require much less material rearrangement than, for example, prior art techniques such as physically rotating a mirror, in that a much smaller quantity of mass transport and charge transport will be required to effect the change in coupling. In practical terms, this means that switching through grating control has, in principle, the potential for high speed, low power consumption, and low optical loss relative to other methods.

For this reason, the selective activation or deactivation of a Bragg grating is ideal for the purpose of switching of laser-derived optical signals. In the past, waveguide gratings such as those described above have almost always been static and fixed in their properties. If the underlying grating can be electronically switched on or off (or modulated as to strength)each such arrangement now becomes a new and different device—a type of switch. Physically, this means that the magnitude of the varying or periodic refractive index distribution which constitutes the grating must be modulated or controlled by some mechanism, ideally to the degree that the periodic structure can be made to vanish, leaving behind a homogeneous transparent region, in which case the grating and its coupling effect become entirely nonfunctional, so that K1 is not coupled to K2. Thus a type of switching device arises whenever any coupling function performed by a waveguide Bragg grating, including those already known to the art, can be electronically turned off and on. However, few realizations of switchable or tunable Bragg gratings have been developed that are fully adaptable to optical waveguide structures. Semiconductor gratings created by microlithography in materials such as InP or GaAs are used as part of distributed feedback lasers, and such gratings can be modulated by charge injection so as to adjust the effective optical period electronically. However, for such gratings the available range of index modulation is relatively small, and the relatively large absolute refractive indices of such semiconductors (typically much larger than glass) implies that waveguide structures made from them must have very small dimensions, causing compatibility problems in matching modes to standard dielectric optical waveguides such as glass-based optical fibers. Also, semiconductor tunable gratings are further limited in that free space versions are not practical, because the substrates are typically not transparent and grating layers insufficiently thick. Switchable gratings have also been devised using layers of nematic liquid crystals captured in periodic relief gratings produced by microlithography, but such structures are complicated and expensive to produce, usually show less than ideal diffraction efficiency, and typically are too slow (10–100 milliseconds) for applications in the photonics industry.

Recent advances in materials science have led to a new family of volume hologram Bragg gratings that are electronically switchable; that is, their power to diffract light may be adjusted or switched, ideally between 100% and zero, by application of an electric field. These gratings are the HPP/LCC's defined above. ESBG's based on these gratings/composites provide a superior and efficient method of realizing switchable gratings. Holographic polymerization means that a solution containing prepolymer, liquid crystal and other ingredients is prepared in a thin layer and then exposed to interfering laser beams which initiate a one step polymerization and diffusion process. This manufacturing technique results in microdroplets of liquid crystal being formed, distributed mostly into planes that follow the interference fringe structure of the incident light, representing the recording of a hologram. By application of an electric field to the spatial distribution of liquid crystal microdroplets permanently frozen into a matrix of transparent polymer, the liquid crystal molecular axes (directors) can be rotated within the droplets, with the overall effect of varying the refractive index contrast between polymer and liquid crystal. If the refractive index of polymer host and liquid crystal droplet is so adjusted as to yield an exact or nearly exact match for a defined polarization of a probe beam or mode, the fringe contrast vanishes and the grating loses its diffractive effect until the electric field is changed again. The net result is an ESBG having an electronically switchable diffraction efficiency.

ESBG'S based on HPP/LCC also have many advantages for incorporation into waveguide devices. The refractive indices of polymers and liquid crystals are typically in a range compatible with the indices of dielectric waveguides of silica or polymers. The one-step holographic recording process is a simple and relatively effortless method of creating Bragg gratings with submicron periods, compared for example to semiconductor gratings whose fabrication requires expensive and time consuming microlithography. In addition, in copending PCT application No. PCT/US97/01519 filed Jan. 29, 1997 entitled "Optical Components Containing Complex Diffraction Gratings and Methods for the Fabrication Thereto" claiming priority to U.S. provisional application Ser. No. 60/010,716 entitled "Switchable-focus Lenses in Holographic Polymer Dispersed Liquid Crystal," a method is disclosed for recording not only simple gratings, but also complex computer designed gratings. Encapsulation of liquid crystals in microdroplets is also an advantage, in that manipulation of droplet size and surface chemistry by methods known to polymer science has been shown to yield much faster response speeds and other beneficial alteration of liquid crystal properties in comparison to the bulk state of liquid crystals.

The magnitude of the refractive index spatial modulation possible with gratings formed in HPP/LCC materials is relatively large, as much as 2% to 5% of the absolute indices, and may then be reduced, ideally to zero, by application of an electric field to deactivate the grating. This large spatial index modulation and large degree of control over same implies that transmission gratings with relatively short interaction lengths, (typically on the order of 10–100 microns depending on the wavelength of use), the period of the grating and other factors, can be combined in a manner sufficient to achieve nearly 100% diffraction efficiency. Short interaction lengths and the possibility for transparent substrates in turn imply that ESBG's are adaptable to both waveguide and free space geometries, and thereby a highly flexible freedom of design is available offering several approaches to large switch and other optical structure architectures by combining in various ways planar switches, waveguide grating couplers, switchable/tunable Bragg filters, free space beam steering, and switchable focus lenses such as those disclosed in the beforementioned PCT application, all based on the same technology. The combination of free space and waveguide switchable gratings possible with ESBG polymer dispersed liquid crystal materials cannot be duplicated by any existing photonic technology such as lithium niobate waveguide, semiconductor, thermo-optic, or traditional liquid crystal approaches. The virtually unlimited 2D/3D design freedom that results can provide several alternative paths to very large optical structure implementations, examples of which are discussed later.

Finally, gratings are inherently wavelength selective and therefore switching appropriately designed gratings on or off, or application of an intermediate voltage to the gratings to tune their effective average index and effective optical periods, can be exploited to create wavelength selective switches and crossconnects, constituting a family of WDM-capable routers.

There are several basic types of components or nodes which may be constructed using ESBG technology. FIG. 1 illustrates in schematic form one such component in the form of a planar guided wave or guided mode 2×2 switch. The switch 10 has an ESBG 12, which may be formed in a variety of ways to be described shortly, mounted on a substrate 14 with two guided mode inputs 16A and 18A and two guided mode outputs 16B and 18B. The inputs and outputs are interchangeable so that optical signals may either enter on guided wave paths 16A and 18A and exit on paths 16B and 18B or may enter on paths 16B and 18B and exit on paths 16A and 18A. Each of the guided wave paths may be standard optical fibers or may be waveguides. Electrical leads 24A, 24B are shown connected to electrodes on the top and bottom respectively of ESBG 12, signals from a suitable control applied across the leads 24 producing a desired electric field across the ESBG.

Figure 2:
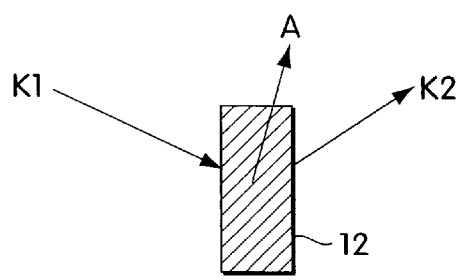
FIG. 2 is a diagram illustrating the vector relationship between input and output light waves with a Bragg grating.
Figure 3A:
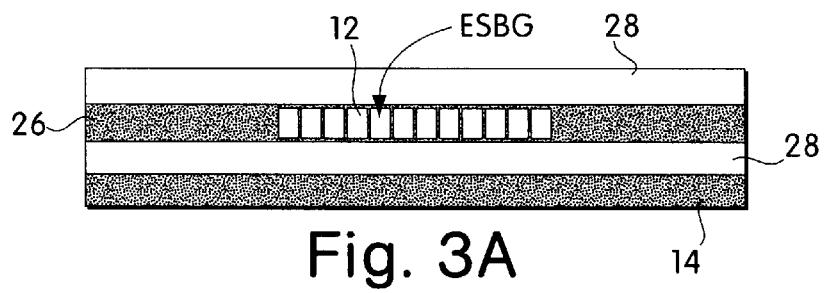
FIGS. 3A and 3B are diagrammatic sectional views illustrating the positioning of an ESBG in the core region and the cladding region respectively of a waveguide.
Figure 3B:
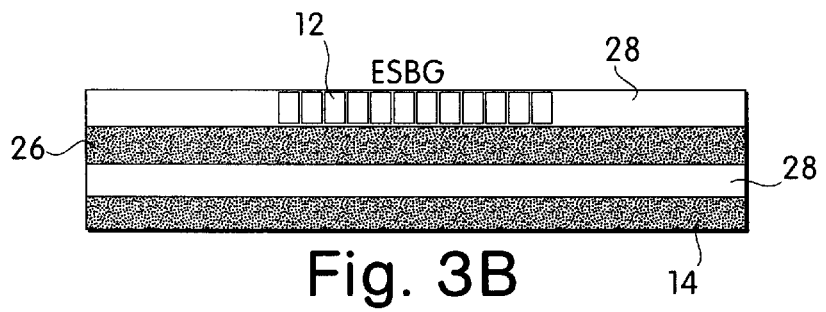

In operation, a light signal coming in on guided wave path 16A is coupled to path 18B in the absence of an electric field across ESBG 12, the grating vector in ESBG 12 being selected to cause the incoming signal to be directed at the appropriate angle to exit on path 18B. Similarly, in the absence of an electric field, an incoming optical signal on path 18A is directed to path 16B. These operations may occur simultaneously in the ESBG. When signals are applied to leads 24 from a suitable source or control to apply an electric field across ESBG 12, the liquid crystal molecules are reoriented so as to permit the waves to pass substantially undeflected, a light beam on input path 16A exiting on path 16B and an input beam on path 18A exiting on path 18B. ESBG's 12 can be designed such that these couplings are performed with an efficiency approaching 100 percent. In particular, the principles of proper design for an ESBG grating to accomplish this purpose are known in the art and are illustrated in FIG. 2 for coplanar coupling. This figure illustrates the grating vector A which, when added to the vector K1 for the incoming wave, results in a diffracted wave having a vector K2 exiting at the desired angle. As indicated earlier, in the presence of an appropriate electric field, the vector A substantially disappears, resulting in the incoming signal passing through the grating undeflected. The period of the grating is chosen according to Bragg match conditions which have been discussed earlier. Other dimensions of the grating for ESBG 12, including its thickness, placement in the waveguides 16, 18 and interaction length, are determined based on computation of a coupling coefficient k, the estimation of which depends in turn on the single mode waveguide dimensions and on indices and other factors contributing to a modal overlap integral. Material parameters such as the optimum index modulation to be obtained by chemistry is similarly determined. Methods for determining all of these items are known in the art.

Where the device 10 is fabricated as an integral waveguide unit, the ESBG region 12 may be placed in either the core or guiding region 26 of the waveguides or in the cladding of evanescent wave region 28 of the waveguides. If the ESBG is in the guiding region as illustration in FIG. 3A, the grating will have an average refractive index close to that of the waveguide core and constitutes a guiding region in itself. If the grating is located in the cladding region 28 above of below the guiding region, as shown in FIG. 3B, the grating average refractive index in the activated state must be lower than that of guiding region 26. The computations required to set parameters for the two versions are similar and a final choice for any given design, will depend on estimates of loss, index matching, interaction strengths and other factors to be balanced in a detailed design. Both embodiments can have value in various applications.

Figure 4A:
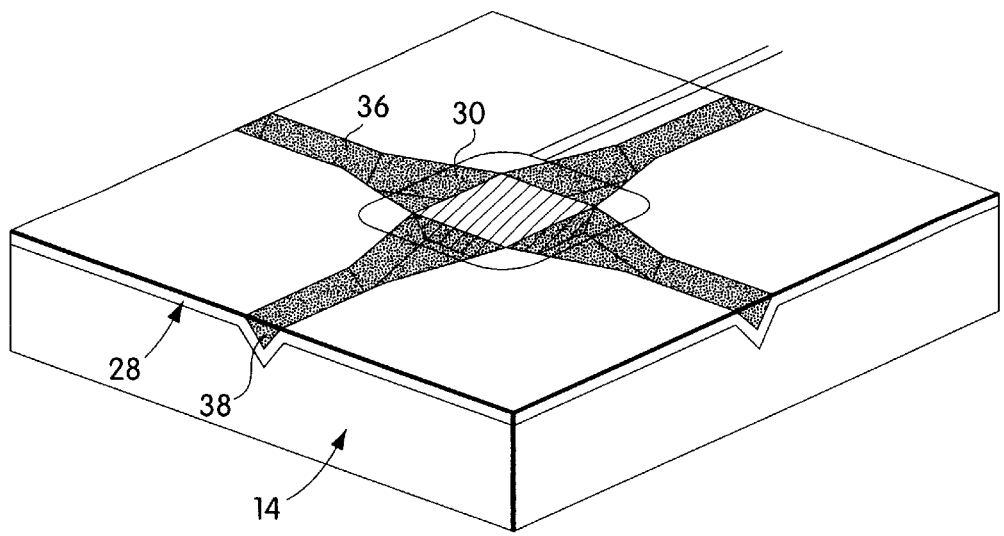
FIG. 4A is a diagrammatic perspective view illustrating the fabrication of an integrated optics waveguide component of the type shown in FIG. 1 in accordance with the teachings of this invention.

Components or nodes 10 may be fabricated using silicon microlithography techniques in a fashion that is widely employed for complex planar waveguides, which are sometimes also referred to as integrated optics or planar lightwave circuits. As illustrated in FIG. 4A, the silicon substrate 14 is formed by microlithographic methods known in the art, for example orientation dependent etching, with a region 30 having a recess or well to receive ESBG 12 in the guiding region of the waveguides. The waveguides 16, 18 leading to the interaction region can be etched as V groves into the silicon and subsequently processed to form silicon dioxide cladding layers 28 with passive polymer filled cores or can be constructed as channel waveguides of deposited glass or polymer resting upon the silicon/silica layer. Alternatively, a similar structure can be based on a quartz substrate micromachined using dry etching, such as reactive ion etching or wet etching, combined with microlithography to create a structure comprising all dielectrics (glasses and polymer) without involving semiconductors. This may be advantageous for some applications because it offers a transparent structure.

Figure 4B:
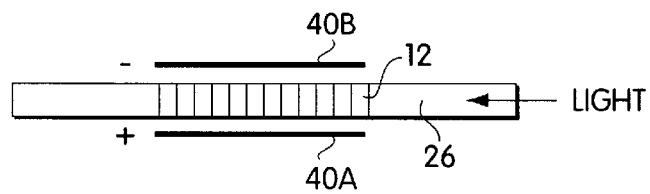
FIGS. 4B and 4C are diagrammatic sectional views illustrating alternative electrode placement for a waveguide core mounted ESBG.

Whether using semiconductors or dielectrics as a substrate, electrodes to apply a substantially uniform electric field to the ESBG region may be provided above and below the region as shown in FIG. 4B. The lower electrode is prepared by applying a conducting layer in a defined region, such as evaporated gold or conducting polymer, or alternatively in the case of silicon substrate, the silicon, if properly conductive, may serve as the bottom electrode.

Figure 5:
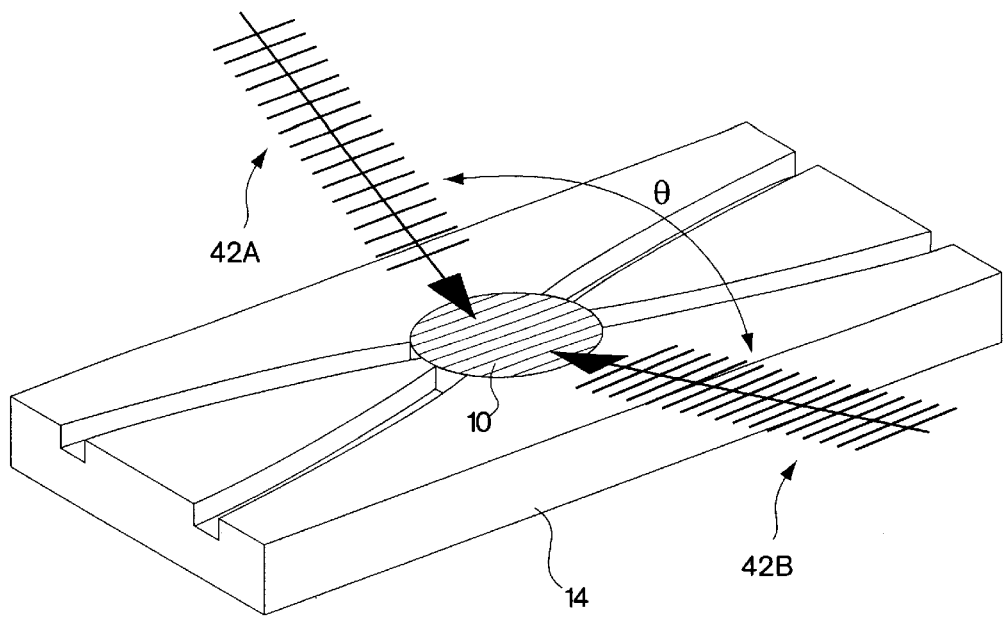
FIG. 5 is a diagrammatic perspective view illustrating the illuminating of a film or region of the HPP/LCC material to form a grating therein.

With either type of substrate, the fabrication may continue by preparing the structure with the recess 30 designed to accommodate ESBG 12. A liquid solution of ingredients know to produce a HPP/LCC may then be deposited in region 30 and a cover glass with a transparent electrode coating, such as indium tin oxide or conducting polymers known in the art, placed over the liquid film. Interfering laser beams at a wavelength λ at which HPP/LCC solution is photosensitive, such as 488 nm or other wavelength depending upon the chemical choices in the solution, is used to expose the grating from outside the plane of the device as shown in FIG. 5. The angle θ between the laser beams determines the period Λ of the grating to be recorded according to the formula $\sin(\theta/2)=\lambda/2\Lambda$. The angle of the two beams to the HPP/LCC producing material determines the orientation of the grating which in turn controls the vector direction A and the resulting grating period. The significance of this vector has already been discussed to some extent and will be discussed with subsequent components as well. After appropriate post-processing stabilization by white light exposure or baking, the ESBG is complete except for protective or packaging layers as appropriate.

Figure 4C:
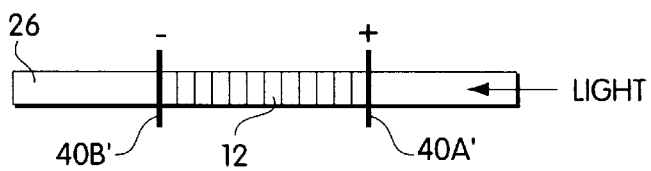

Alternatively, if the ESBG is in cladding 28 as shown in FIG. 3B rather than in core 26, recess 30 need not be formed and the ESBG may be applied as a film on the guiding or core region 26 of the waveguide and then covered with a cover glass and exposed to form the grating, the exposure being performed in substantially the same manner described with respect to FIG. 5. Another method for forming the ESBG in the cladding region is to prepare the ESBG in a laser laboratory or other appropriate facility and to then float it from a preparation substrate and attach it to the device substrate by chemical methods known for the handling of polymer films. FIG. 4C illustrates a further alternative structure where an electric field is applied in the plane of the substrate by electrode 40A' and 40B', instead of normal to the plane of the substrate as shown in FIG. 4A, by supplying substantially transparent electrodes or other conducting material on small portions of vertical surfaces. The vertical electrodes are positioned substantially perpendicular to the direction of the incoming light beam.

Figure 4D:
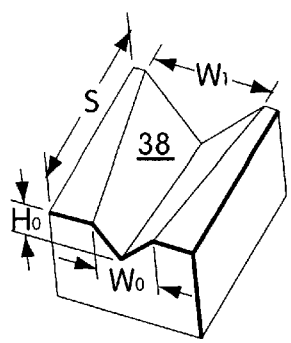
FIG. 4D is a diagrammatic perspective view illustrating an adiabatic mode-matching waveguide suitable for use as a waveguide in practicing the teachings of this invention.

FIG. 4D illustrates a waveguide 16, 18 which is tapered to provide adiabatic mode-matching. In particular, by taking advantage of the crystallographically determined natural etch properties of silicon, the V grooves 38 for the waveguide can be tapered simultaneously in the propagation direction and in the transverse direction with a fixed aspect ratio of 0.706 based on a 57 degree sidewall. This leads to tapers (typical angles one degree) able to adiabatically convert, for example the single mode spot emitted by a laser diode (typically 2 micrometer×4 micrometer) to the single mode spot of an optical fiber (typically 9–10 micrometer) over a transition zone S about 200 micrometer long.

The structures and methods described above may be extended to integrated planar structures containing many ESBG nodes. Coplanar 2×2 structures can be interconnected by single mode waveguides in a wide variety of architectures. The waveguides would typically be connected to single mode optical fibers by methods known in the art or to other light conducting elements. Each ESBG is also connected electronically by individual electrodes so that it can be independently activated or deactivated. In this way an array of ESBG's can be programmed to provided complex switching or other desired architectures.

Figure 6:
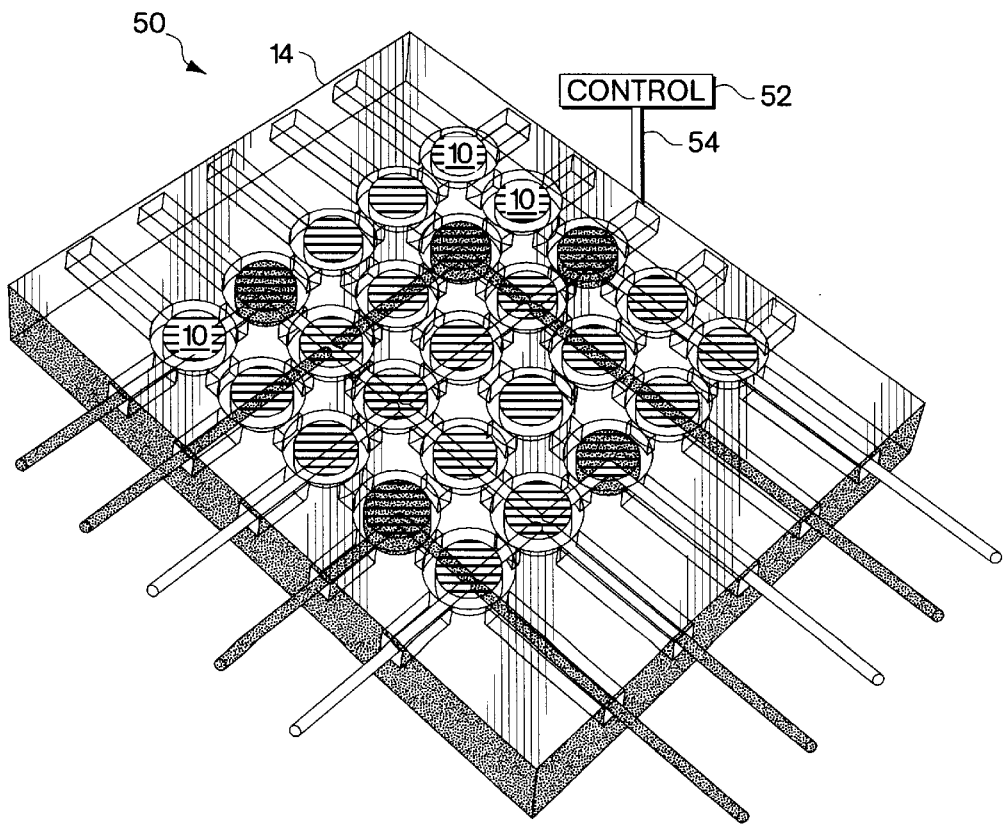
FIG. 6 is a diagrammatic perspective view of a 5×5 planar crossbar switch employing ESBG nodes.

FIG. 6 illustrates one example of a switching structure 50 which may be formed using the ESBG nodes 10. The structure 50 is a 5×5 crossconnect switch in a design known as a "crossbar". A crossbar switch has $N^2$ nodes 10 (25 nodes for the embodiment shown). The 90° crossing angle indicated for this embodiment is achievable because the requisite submicron grating periods can easily be recorded in the ESBG by the techniques described earlier. The methods utilized to fabricate a planar array such as that shown in FIG. 6 are a direct extension of those for the individual 2×2 node 10. An electronic control 52 is shown which is connected through cable 54 to the electrodes of nodes 10 to selectively apply signals thereto to effect the desired optical switching. The construction of such controls is known in the art. Since the dimensions of an individual node can be less than 100 microns square in effective area, the spacing of nodes on an integrated substrate is limited primarily by considerations of waveguide parameters such as minimum bend radii. A packaging density of one node per square mm or greater should be possible, implying that each square inch of substrate may support in excess of 600 switching nodes, a number which is sufficient to implement up to 128×128 switch in some architectures.

Figure 7:
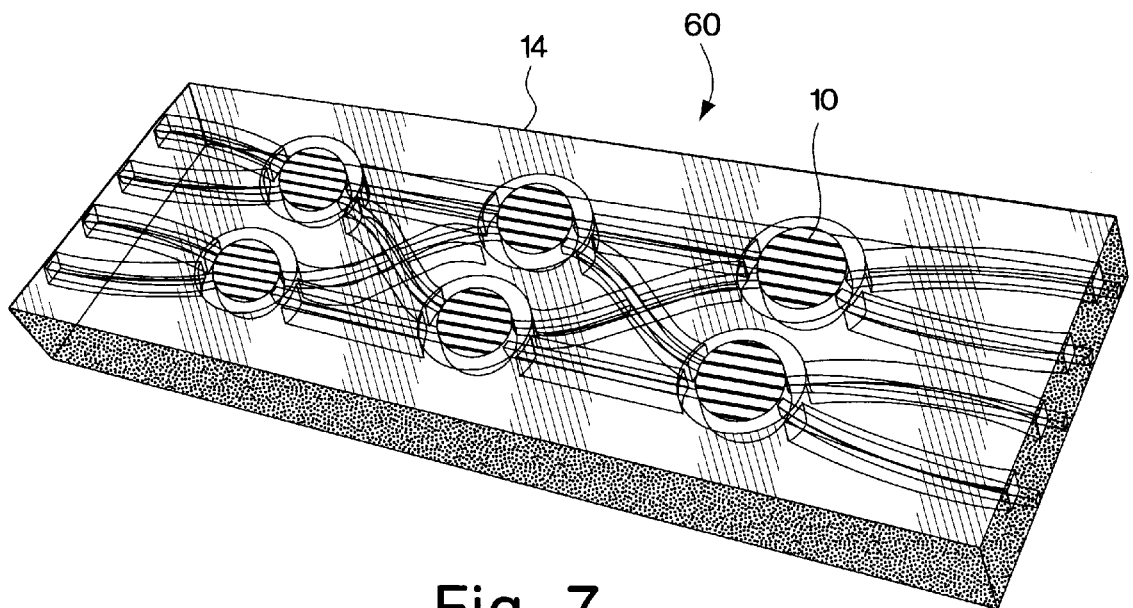
FIG. 7 is a diagrammatic perspective view of a 4×4 Benes net switching structure utilizing six ESBG nodes.

Many different architectures have been analyzed for photonic switching fabrics. An architecture is said to be nonblocking if any connection is possible, without regard to earlier established connections. For some applications, reconfigurably nonblocking switches are sufficient. Whereas crossbar configurations are completely nonblocking, they are known to be inefficient in that they require $N^2$ nodes for an N×N crossconnect. Other switching architectures with fewer nodes are known to the art, such as the Benes net, which is reconfigurably nonblocking. FIG. 7 shows a 4×4 Benes net 60 comprising six nodes 10, as opposed to the 16 nodes required for a 4×4 crossbar switch, indicating the use of waveguides which intersect on the substrate. A Benes net of any scale can be similarly realized with ESBG's, as can most or all of the alternative switching architectures (dilated Benes net, perfect shuffle, and many others) that have been extensively analyzed in the scientific and engineering literature of photonic switching.

Although one fabrication technique described earlier, using silicon technology, is obviously limited to planar structures, ESBG'S as such are not so limited, particularly if constructed using transparent substrates and materials. A fabrication approach using glass substrates with glass or polymer waveguides and ESBG'S applied in recesses (guiding region) or in the cladding region lends itself to nonplanar and even curved surfaces. As an illustration of one such possibility, FIG. 8A and 8B show a 4×4 Benes structure 62 consisting of ESBG'S deposited on a glass cylinder along with appropriate polymer guiding and cladding layers and channel waveguides. This structure illustrates one potential advantage provided by the fabrication flexibility afforded by the polymer ESBG'S, the topology of a Benes net on a cylindrical surface showing that in this case, unlike the conventional planar realization, the connecting waveguides do not cross one another. Noncrossing waveguides will serve to reduce the optical losses that normally result from such intersections. ESBG waveguide switching structure on curved surfaces may be considered for a variety of other special applications.

Figure 9:
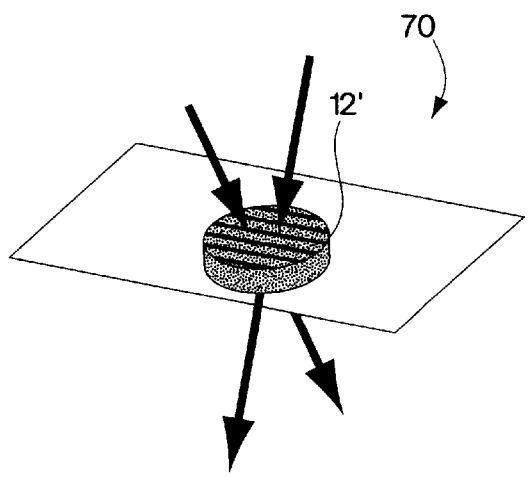
FIG. 9 is a diagrammatic perspective view of a prior art ESBG free space switch.

FIG. 9 shows a second building block in the form of a free space transmission grating 70, constituting a 2×2 switch. Switches 70 have previously existed. The modes coupled by a free space 2×2 node are not guided modes but rather free space modes. Nevertheless, the fabrication of a free space ESBG for this function is similar in some respects to that described earlier for planar nodes/structures, except that the substrate must be transparent (i.e., not silicon or like material). Efficient free space ESBG 2×2 beam steering devices have been demonstrated with more than 99% diffraction efficiency at specified wavelengths in the range 633–1550 nm, using films only 10–35 nm thick, that is, with an interaction length of this scale, and an aperture as required for the optical system at hand, typically in the range 1–25 mm. The Bragg matching condition in this case is optimized by an incident laser beam at a specific angle of incidence. Methods of recording complex computer designed free space ESBG's have been disclosed in the beforementioned copending PCT application, and these can couple simple laser beams into virtually any desired output distribution, and can be switched.

Figure 10A:
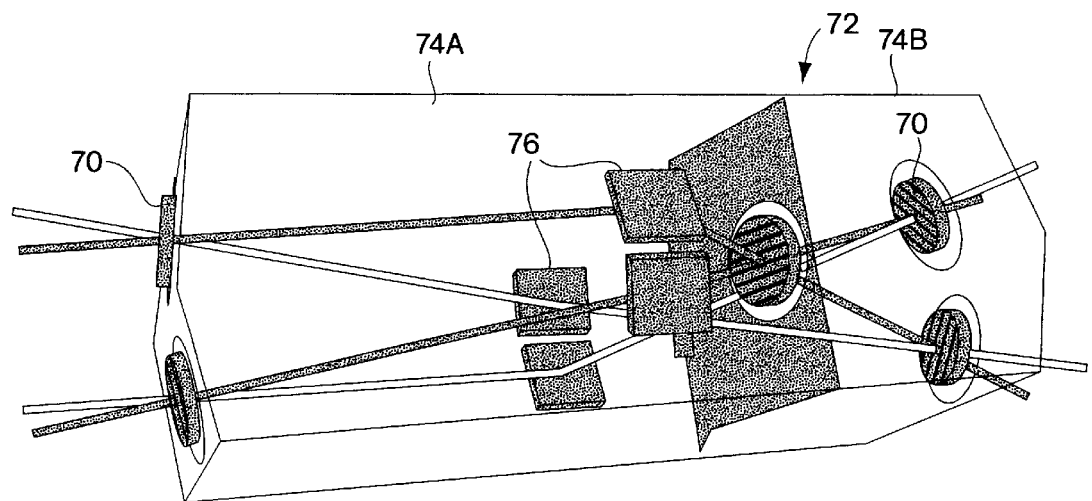
FIGS. 10A, 10B and 10C are top, side and end perspective views respectively of a 4×4 Benes net of six free space ESBG's of the type shown in FIG. 9.
Figure 10B:
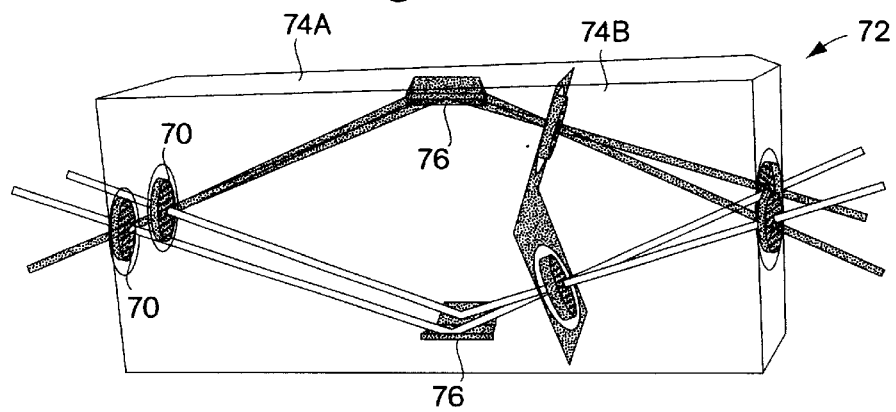
Figure 10C:
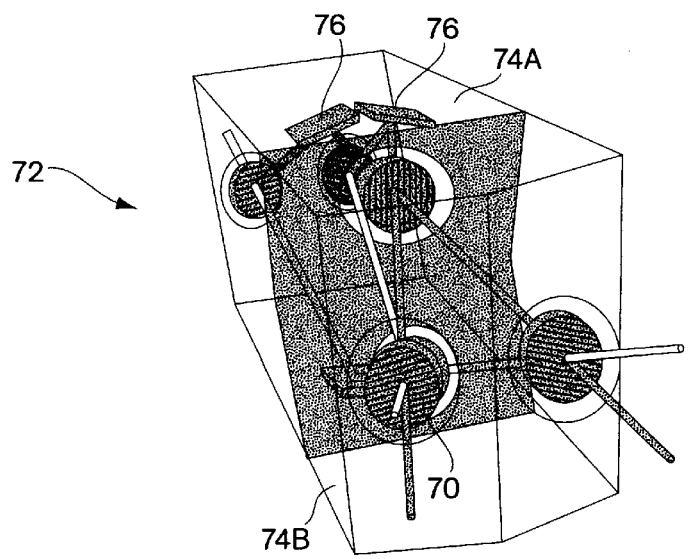

FIGS. 10A–10C show a 4×4 unguided wave or free space Benes net 72 comprising six ESBG'S 70 applied to surfaces of a pair of fitted transparent glass prisms 74A, 74B, the angles of the surfaces being formed to provide pre-aligned Bragg matching. Mirrors 76 are also provided to guide the waves. In this case, the unguided waves pass through a glass transparent media, however embodiments with air as the transparent media are also possible. The free space Benes switch is functionally equivalent to the cylindrical Benes waveguide switch 62 (FIGS. 8A, 8B) and the planar waveguide Benes switch 60 shown in FIG. 7. For purposes of efficiently coupling light from input and output optical fibers to the switch, the planar and cylindrical embodiments, incorporating waveguides, will have a natural advantage over the free space embodiment using nonguided modes. However, the possibility of free space beam steering is nevertheless relevant to fiber optic crossconnects because of the possibility of combining, in one structure, both waveguide and free space switches. While such a structure is not specifically shown, it is within the contemplation of the invention.

One purpose of illustrating the three versions of the 4×4 Benes nets is to show how ESBG'S, which are capable of deposition on transparent surfaces, possess glass-compatible indices, and provide large grating index modulations to achieve short interaction lengths, can be applied to either or both of waveguide and freespace structures, or to combinations thereof. This feature of polymer ESBG'S cannot be duplicated, for example, by semiconductor switchable gratings, which are necessarily possible only on strictly planar, opaque substrates.

Figure 11:
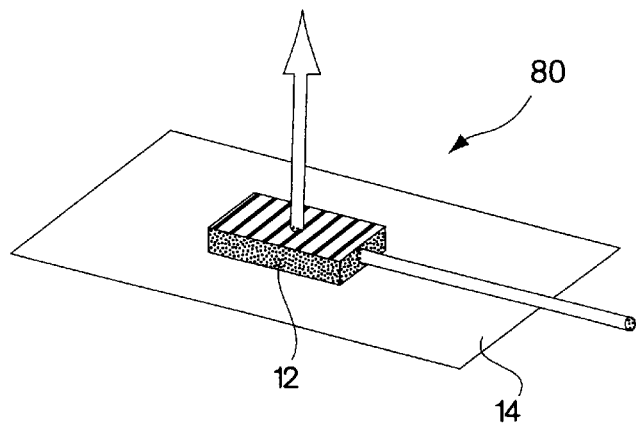
FIG. 11 is a diagrammatic perspective view of an ESBG component which may function as a guided wave/unguided wave in/out coupler.

Guided modes can also be coupled to radiated unguided modes, or vice versa, at a wide range of angles of incidence relative to the waveguide plane, by means of waveguide gratings. FIG. 11 shows a third type of switch component/ node 80 which realizes such a grating in the form of an ESBG 12 and deactivates such a grating electronically. In general, the grating to perform such functions must be constructed with its grating vector A slanted at an angle relative to the plane of the waveguide in order to satisfy the Bragg match condition, which is easily accomplished in the case of ESBG fabrication by means of appropriately adjusting the angles of incidence of the external laser beams used to record the ESBG (i.e. by having the beams 42A, 42B at an appropriate angle to the plane or face of ESBG or HPP/LCC 12).

In addition to simple gratings, it is known in the art of integrated optics that complex waveguide gratings may be used to couple guided modes into focused free space beams, or alternatively into designed distributions of light energy, for example, an arrangement of several sub-beams such as might be desired for the purpose of coupling optical energy from a guided mode into a multiplicity of detectors or other ports after a distance of propagation in free space. In such cases, ESBG'S bearing complex gratings can be recorded by methods involving computer generated masks such as have been described in the beforementioned copending PCT application. Consequently, focussed, distributed, multipoint or many other varieties of complex outcoupling (or incoupling) may become a switchable function through ESBG implementation.

Figure 12:
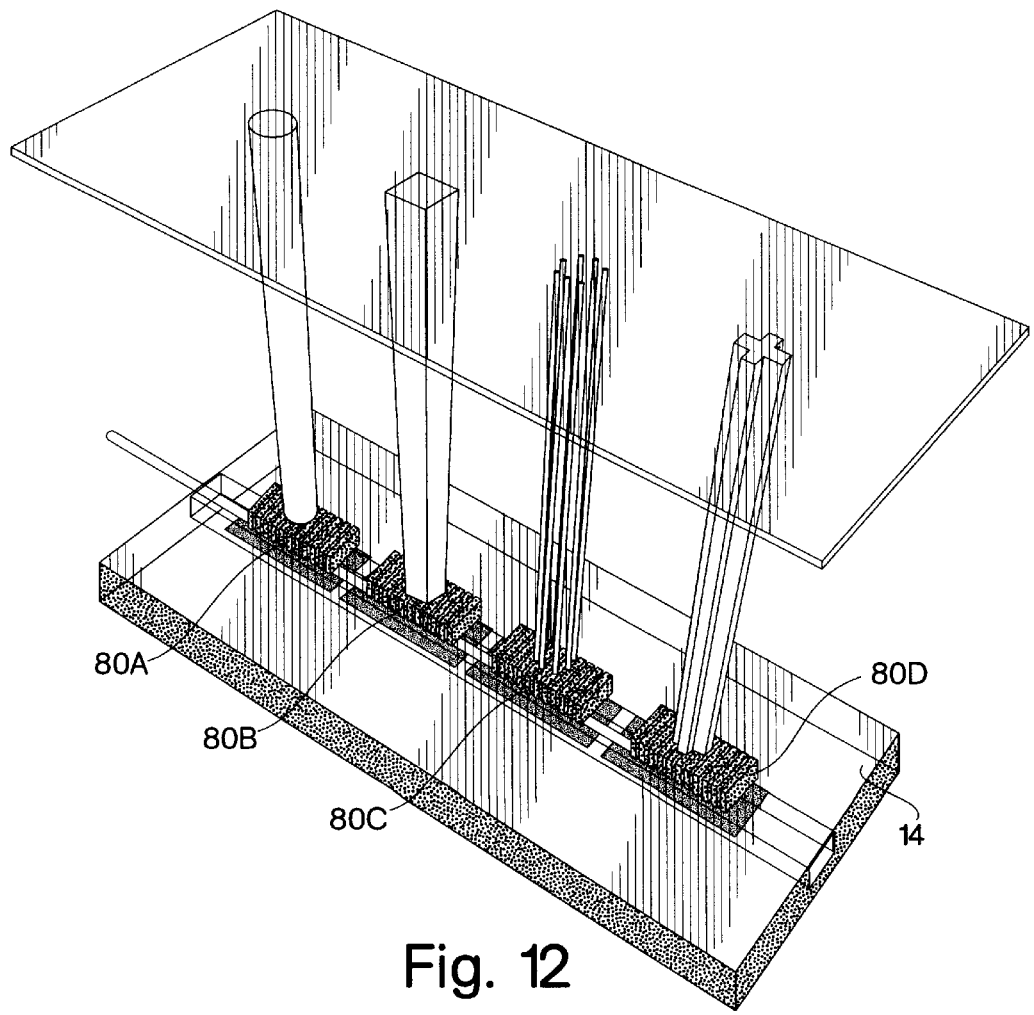
FIG. 12 is a diagrammatic perspective view illustrating four couplers of the type shown in FIG. 11 containing complex computer designed gratings which may be outcoupled as shown.
Figure 13A:
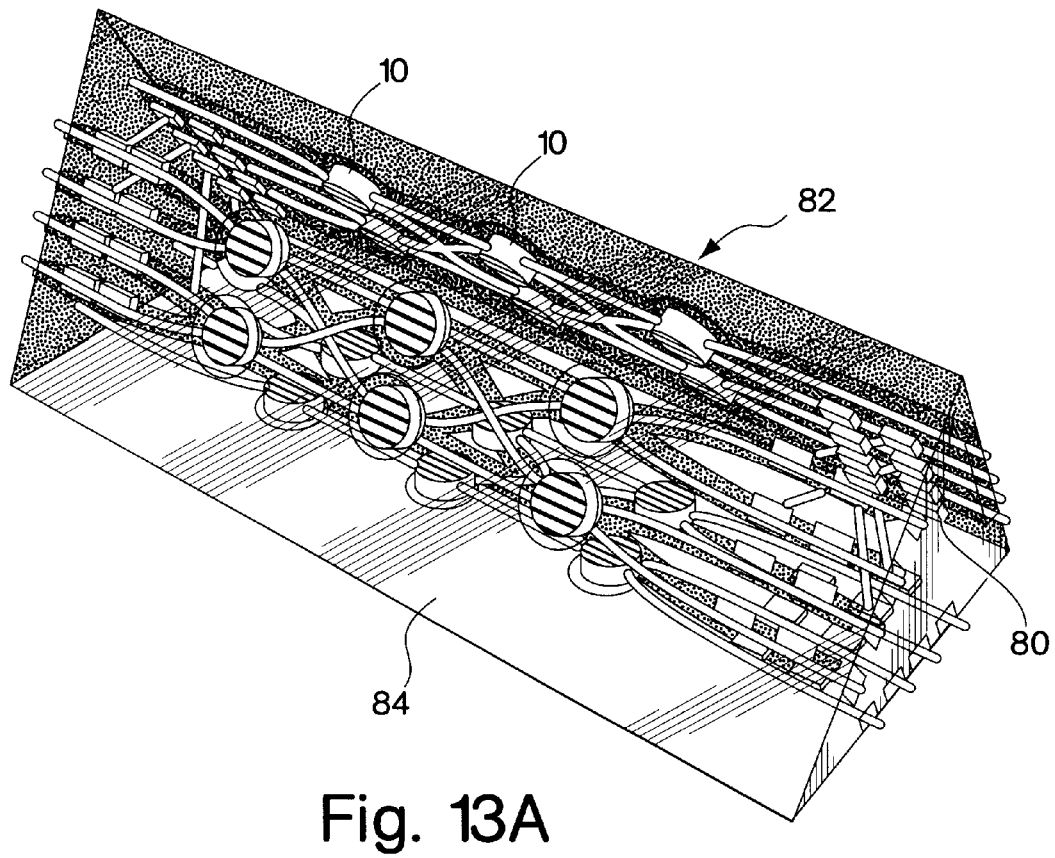
FIGS. 13A and 13B are side and end perspective views respectively of a 12×12 three dimensional switching structure formed as three interconnected plane substructures on a prism.
Figure 13B:
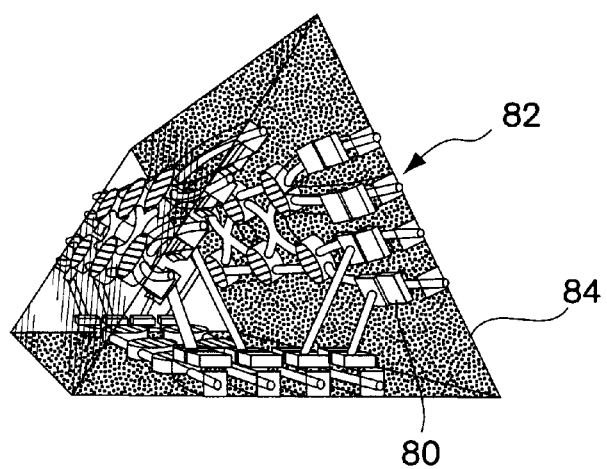

FIG. 12 shows a series of waveguide ESBG outcouplers 80A–80D on a single substrate 14. By selectively deactivating or activating individual ESBG's in this sequence, electronic programming of the outcoupling distribution of light energy can be effected. One use of this variant will be switchable coupling from surface to surface of a transparent glass prism. FIGS. 13A, 13B show one example 82 of the numerous possible such structures which are available utilizing the teaching of this invention. A glass prism 84 is fabricated with a 4×4 or larger Benes net on each surface comprising six ESBG type 1 nodes 10. Switchable coupling from surface (or plane) to surface is effected through free space (glass) in the interior of the transparent prism by means of ESBG type 3 nodes 80, i.e., waveguide outcouplers at transmitting points and waveguide incouplers at receiving points. With suitable ESBG's; guided wave modes, for example optical fibers, might also be utilized for interconnecting the planes. The resultant structure in FIGS. 13A, 13B is a 12×12 crossconnect switch on three surfaces of a glass prism. Other three dimensional architectures, including stacked structures are also possible.

Figure 14:
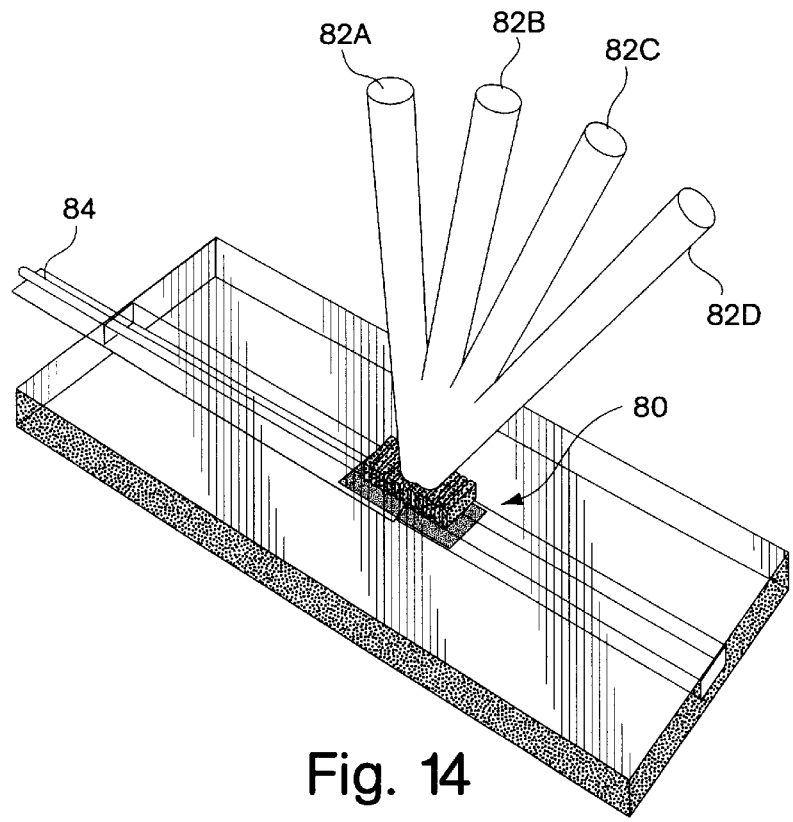
FIG. 14 is a diagrammatic perspective view of an ESBG node functioning as a WDM outcoupler.

Waveguide gratings may also be designed and fabricated to have longer interaction lengths then type 1 nodes 10, by adjusting the liquid crystal loading and other variables in the HPP/LCC formulation, in order to for example to construct a grating displaying optimum, nearly 100% diffraction efficiency with 500–1000 microns or more of interaction length, instead of designing for the shorter interaction lengths desirable for coplanar coupling. With the guided mode propagating through a substantial path length in the grating, the effective optical period of the grating will change with applied voltage, typically over a range of 0.5%–3%. This in turn will cause the Bragg matched outcoupling angle to vary with respect to voltage for a given wavelength, or equivalently with respect to wavelength for a given voltage. FIG. 14 illustrates how this principle of angular tuning is used to selectively control, by means of adjusting voltage, which of several wavelength channels 82A–82D transported in the waveguide 84 is outcoupled at a specific angle, and which therefore is selectively received at a point in space.

Figure 15:
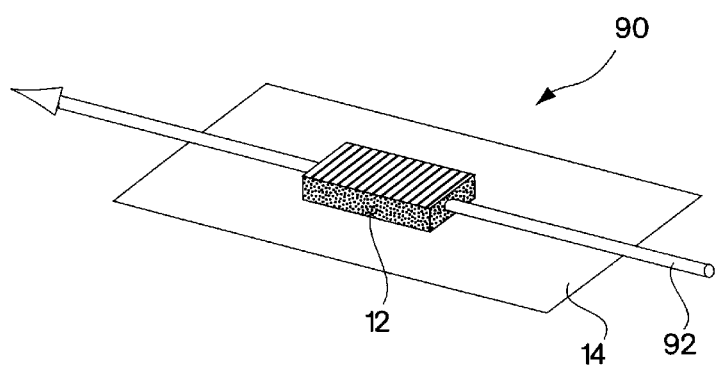
FIG. 15 is a diagrammatic view of an ESBG node which may function as a reflection node.

A fourth type of ESBG component or node makes use of the fact that waveguide gratings, with the grating vector substantially parallel to the waveguide path direction, can be used to couple a forward to a backward mode, i.e., a reflect mode. By proper choice of grating period, index modulation and interaction length, this can be used to construct a reflective Bragg filter 90 (FIG. 15) for a narrow wavelength band. This effect is commonly practiced for example in optical fiber Bragg grating filters. The center wavelength for Bragg reflection is the wavelength $\lambda = 2n_f \Lambda$, where $n_f$ is the average effective mode index and $\Lambda$ the physical grating period.

By manifesting such a grating with an ESBG, the forward to backward coupling can be activated or deactivated under voltage control, creating a new switching function, node type 4, in which a selected wavelength channel among the signals (channels) transported in the guide can be switched to be reflected (filtered) or to continue. Furthermore, the voltage can be adjusted between the extremes of activating or deactivating the grating and used to tune the index modulation in an intermediate region, thereby tuning the wavelength of Bragg match. As an approximate estimate, HPP/LCC materials can be formulated to maximize this range if wavelength tunability is desired for WDM systems. For example, even if only 1% voltage control of average index modulation is available at 1550 nm wavelength, the result will be a wavelength tuning range of 15 nm, more than enough for useful WDM routing control. Therefore, by suitably controlling the electric field across the reflection filter 90, a single WDM channel may be passed and all other channels on the waveguide 92 reflected, a single channel may be reflected and all others passed, or any other desired combination of passed and blocked channels may be effected.

Figure 16:
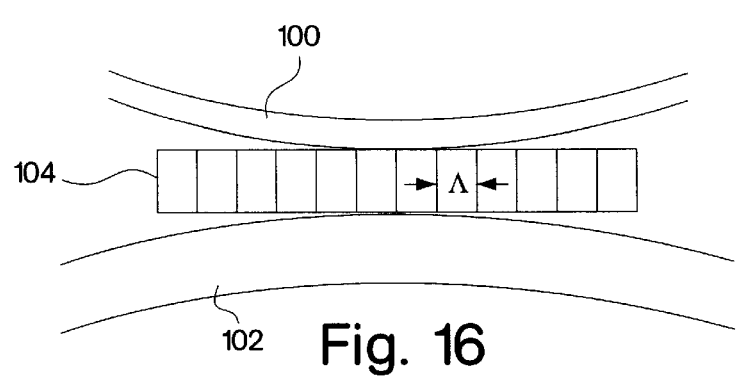
FIG. 16 is a diagrammatic sectional view of a node formed by two guided wave elements interconnected by an ESBG.

Considering FIG. 16, two parallel but slightly dissimilar waveguides 100, 102 transporting WDM signals are spaced a small distance apart, so that their evanescent fields (i.e. cladding regions 28) overlap significantly. At a given wavelength, guide 100 has a propagation vector of magnitude b1 and guide 102 of b2. This difference in propagation properties may be achieved by small differences in index or diameter of the guides. An ESBG grating 104 is located in the region between the waveguides, with its grating vector substantially parallel to both of them. The two guides 100 and 102 will not substantially couple unless the condition $b1-b2 = 2\pi/\Lambda$, where $\Lambda$ is the period of the grating is satisfied. Coupling of a guide 100 mode to a guide 102 mode and vice versa will be dependent on this matching condition, which in turn can be arranged, through suitable choices of material parameters, to be highly sensitive to wavelength and to the voltage applied to the ESBG grating. This means that a chosen wavelength channel can be selectively coupled, by varying the voltage applied to the ESBG, while other channels remain in their original guides, constituting a wavelength selective 2×2 crossconnect node. Elaboration of such nodes with the others defined earlier, and integration of many such devices onto a two dimensional or three dimensional structure, will permit an entire family of wavelength selective cross-connect architectures to be implemented. Other of the node types previously defined may also be used, either alone or in combination with other node types to permit numerous other families of two dimensional and/or three dimensional structures to be implemented, which structure are for a single wavelength or are wavelength selective.

Figure 17A:
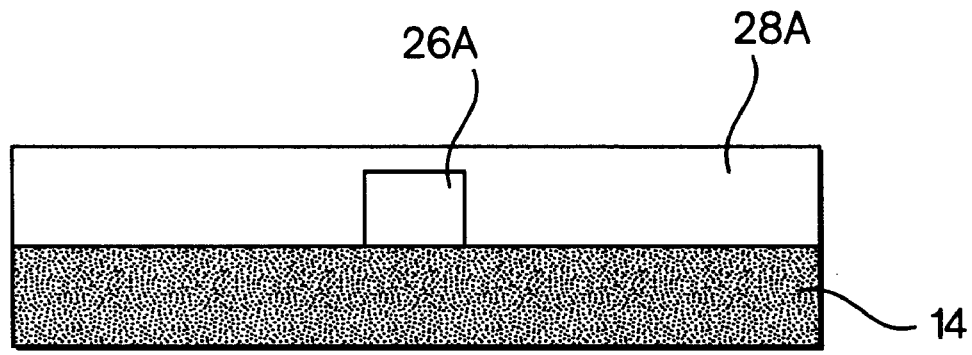
FIGS. 17A–17C are sectional views of a waveguide suitable for use in practicing the teachings of this invention illustrating varying aspect ratios for the waveguide core.
Figure 17B:
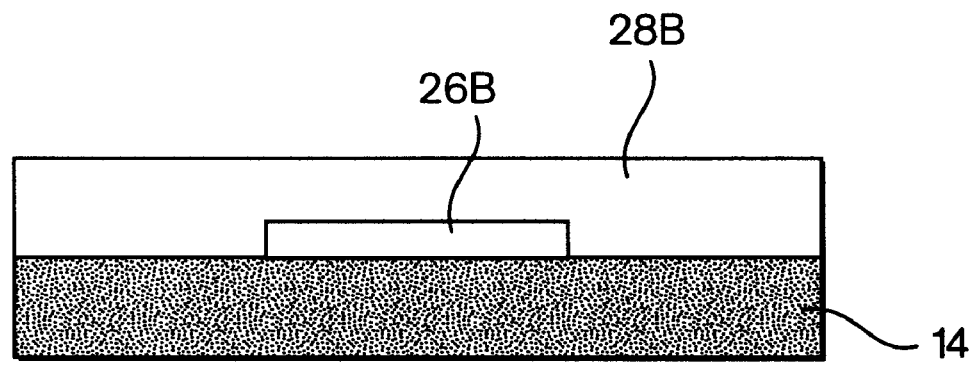
Figure 17C:
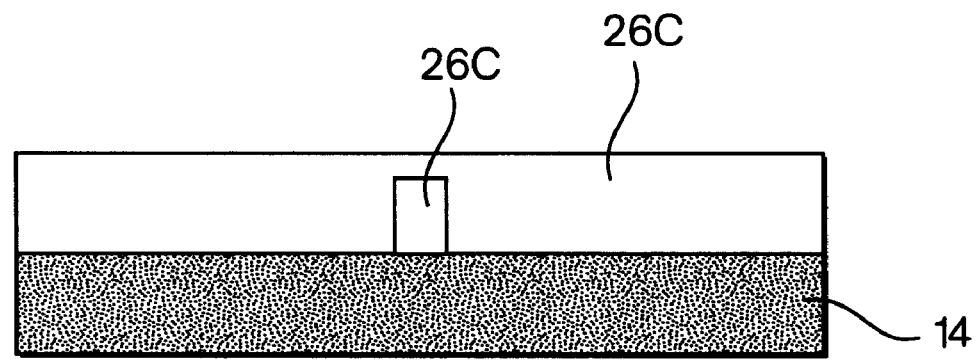

Since coupling by means of waveguide Bragg gratings is intrinsically polarization sensitive, achieving substantially or completely polarization independent coupling and switching will require techniques to counterbalance the differences in coupling strength between the TM and TE polarizations. One method of accomplishing this is illustrated in FIGS. 17A–17C, with a raised channel waveguides being utilized rather than V grooves for this illustration which will be considered for example to be a Bragg reflective filter 90. In the case where channel waveguides are provided in a fabrication system that permits independent determination of the width and the height of the waveguide core, as is the case for the raised channel waveguides shown and for grooved channels formable in some substrates (but is not for V grooves formed in a silicon substrate), adjustment of the waveguide aspect ratio can be used to provide a desired difference in propagation vectors between TE and TM modes within the ESBG grating guiding region 26, influencing their relative forward to backward grating coupling strength. Appropriate use of this adjustable parameter can offset the intrinsic polarization dependencies, with the end result of nearly or fully polarization insensitive switching.

While the invention has been shown and described above with respect to selected types of ESBG components or nodes, with respect to selected structures utilizing such ESBG nodes, and with respect to particular techniques for fabricating guided wave nodes and structures, it should be understood that these nodes, structures and techniques are by way of example only and that one skilled in the art could construct other nodes and/or structures utilizing techniques other then those specifically disclosed while still remaining within the spirit and scope of the invention. The invention is therefore to be limited only by the following claims.

What is claimed is:

1. A switchable optical component comprising:
   an ESBG element;
   first and second electrodes positioned on opposite sides of said element for selectively applying an electric field thereacross;
   at least one optical input path to said element and at least one optical output path from said element, at least one of said input optical paths and said output optical paths being guided wave optical paths;
   the optical effect which the element has on optical signals inputted thereto, and thus any optical signal appearing on said at least one output, varying as a function of the electric field applied across the element.

2. A component as claimed in claim 1 wherein at least one of said input optical paths and said output optical paths are optical waveguides.

3. A component as claimed in claim 2 wherein said component is an integral device with a substrate and with the optical waveguide and the element being formed on the substrate.

4. A component as claimed in claim 2 wherein the element is formed in a core region of the optical waveguide.

5. A component as claimed in claim 2 wherein the element is formed in a cladding region of the optical waveguide.

6. A component as claimed in claim 1 wherein both the input optical paths and the output optical paths are optical waveguides.

7. A component as claimed in claim 1 wherein at least the input optical paths are waveguides, and wherein the aspect ratio for at least the input path waveguides are controlled to compensate for polarization sensitivity of the element.

8. A component as claimed in claim 1 wherein said component is an optical switch, and wherein the element has two said input paths and two said output paths, the element passing light received on either input path to either output path depending on the electric field applied across the element.

9. A component as claimed in claim 1 wherein each output path is at a Bragg angle to a different one of the input paths, and wherein, in the absence of an electric field across the element, light received on an input path is outputted on the output path at a Bragg angle thereto, while in the presence of an electric field across the element, light passes substantially undeflected through the element to an output path not at a Bragg angle to the input.

10. A component as claimed in claim 1 wherein said optical signals applied to the element are WDM signals having multiple channels at different wavelengths, and wherein the channel from an input path which is passed to a given output path varies as a function of the electric field applied across the element.

11. A component as claimed in claim 1 wherein said component is a reflection component, an optical signal on an input path being reflected to the input path for a first electric field across the element and passing through the element to an output path for a second electric field across the element.

12. A component as claimed in claim 11 wherein the first electric field is a substantially zero field across the element.

13. A component as claimed in claim 11 wherein said optical signals applied to the element are WDM signals having multiple channels at different wavelengths, and wherein said component is a reflection filter, the one or more channels being reflected and the one or more channels of an input passing through the element to an output being a function of the electric field across the element.

14. A component as claimed in claim 1 wherein said component is an out-coupler, a signal on an input path being coupled out of the plane of the component at a selected angle or passing through the element as a function of the electric field across the element.

15. A component as claimed in claim 14 wherein said optical signals applied to the element are WDM signals having multiple channels at different wavelengths, and wherein the channels coupled out of the plane of the component and the angle at which each channel is coupled out are a function of the electric field across the element.

16. A component as claimed in claim 1 wherein said input path and said output path are each a guided wave optical component having a core region and a cladding region, the paths being oriented so that the cladding regions of the two paths significantly overlap in a selected area, and wherein said element is in said overlap area, being in the cladding region for both paths.

17. A component as claimed in claim 1 wherein said element has a complex, computer generated grating formed therein.

18. A switchable optical structure comprising:

a least two ESBG nodes, each of which has at least one optical input and at least one optical output;

N optical inputs, each optical input being optically connected to a node input;

optical interconnects within the structure joining selected node outputs to selected node inputs;

M optical outputs, each optical output being optically connected to a node output; and controls for selectively applying electric fields across the node ESBG's to control the optical outputs to which optical signals appearing at the optical inputs are applied.

19. A structure as claimed in claim 18 wherein said structure is a planar structure and wherein said optical interconnects are guided wave optical paths.

20. A structure as claimed in claim 18 wherein said structure is an integrated structure and wherein said optical interconnects are waveguides.

21. A structure as claimed in claim 18 wherein said structure is a three dimensional structure formed of a plurality of substructures of nodes connected in the substructure by guided wave optical paths, and including nodes in each substructure for selectively interconnecting the substructures through optical paths.

22. A structure as claimed in claim 21 wherein the optical paths interconnecting substructures are unguided wave paths through a transparent medium, and wherein said nodes in each substructure for selectively interconnecting substructures are guided wave/unguided wave optical couplers.

23. A structure as claimed in claim 21 wherein the optical paths interconnecting substructures are fiber optic paths.

24. A structure as claimed in claim 18 wherein said structure is an integrated structure formed on a curved substrate.

25. A structure as claimed in claim 24 wherein said substrate is cylindrical.

26. A structure as claimed in claim 18 wherein optical signals applied to said structure are WDM signals having multiple channels at different wavelengths, and wherein the ESBG's for at least selected ones of said nodes are wavelength selective ESBG's, the one or more channels/wavelengths outputted from such nodes being a function of the electric field applied thereacross.

27. A structure as claimed in claim 26 wherein said structure is a planar structure and wherein said optical interconnects are guided wave optical paths.

28. A structure as claimed in claim 26 wherein said structure is a three dimensional structure formed of a plurality of substructures of nodes connected in the substructure by guided wave optical paths, and including nodes in each substructure for selectively interconnecting the substructures through optical paths, the nodes in each substructure for interconnecting substructures being wavelength selective nodes.

29. A structure as claimed in claim 18 wherein the nodes in said structure are at least one of free space switch nodes, guided wave switch nodes, guided wave/unguided wave in/out coupler nodes, reflection nodes and guided wave interconnect nodes.

30. A structure as claimed in claim 18 wherein the nodes in said structure are at least two of free space switch nodes, guided wave switch nodes, guided wave/unguided wave in/out coupler nodes, reflection nodes and guided wave interconnect nodes.

* * * * *